US008430219B2

(12) United States Patent
Xiang et al.

(10) Patent No.: US 8,430,219 B2
(45) Date of Patent: Apr. 30, 2013

(54) POWER ACQUISITION EQUIPMENT FOR A GANTRY CRANE

(75) Inventors: Aiguo Xiang, Wuhan (CN); Haiming Xiong, Shenzhen (CN); Pei Fan, Wuhan (CN)

(73) Assignees: Wuhan Guide Electric Co., Ltd., Wuhan (CN); Wuhan Guide Electromechanical Engineering Co., Ltd., Wuhan (CN); Chiwan Container Terminal Co., Ltd., Shenzhen (CN)

( * ) Notice: Subject to any disclaimer, the term of this patent is extended or adjusted under 35 U.S.C. 154(b) by 730 days.

(21) Appl. No.: 12/647,440

(22) Filed: Dec. 26, 2009

(65) Prior Publication Data

US 2010/0224584 A1 Sep. 9, 2010

(30) Foreign Application Priority Data

Mar. 6, 2009 (CN) .......................... 2009 1 0061008

(51) Int. Cl.
*B60L 5/22* (2006.01)

(52) U.S. Cl.
USPC ............... 191/45 R; 212/324; 191/66; 191/55

(58) Field of Classification Search .................... 191/40, 191/41, 45 R, 50, 54, 55, 59, 59.1, 64, 65, 191/66, 68, 70; 212/280, 312, 324, 328, 212/331

See application file for complete search history.

(56) References Cited

U.S. PATENT DOCUMENTS

| | | | | | |
|---|---|---|---|---|---|
| 5,551,350 | A * | 9/1996 | Yamada et al. | ............... | 104/293 |
| 5,709,292 | A * | 1/1998 | Breitbach et al. | ............... | 191/65 |
| 6,152,273 | A * | 11/2000 | Kilkenny | ....................... | 191/58 |
| 2012/0037471 | A1 * | 2/2012 | Schmiedle et al. | ............. | 191/50 |

FOREIGN PATENT DOCUMENTS

| | | | |
|---|---|---|---|
| CN | 1994850 | * | 7/2007 |
| CN | 200946068 | * | 9/2007 |
| CN | 201864480 | * | 6/2011 |
| DE | 102009010122 | * | 9/2010 |
| KR | 2010130663 | * | 12/2010 |

* cited by examiner

*Primary Examiner* — S. Joseph Morano
*Assistant Examiner* — Zachary Kuhfuss
(74) *Attorney, Agent, or Firm* — Matthias Scholl P.C.; Matthias Scholl

(57) ABSTRACT

A power acquisition equipment, including at least: a power supplying portion, including at least: a pair of first posts, multiple second posts, multiple upper brackets, multiple lower brackets, multiple tightening devices, a cathode slide line, and an anode slide line, a power acquisition portion, including at least: a slide plate, a driving device, an adjusting device, a first base, and a linkage mechanism, and a control portion, including at least: a pair of front laser range sensors, a pair of back laser range sensors, multiple photoelectric detecting plates, a PLC controller, and an inverter driving system. The equipment features simple operation and high efficiency, and is retractable, stable, safe, cost-effective, and environmental friendly.

14 Claims, 10 Drawing Sheets

POWER ACQUISITION EQUIPMENT FOR A GANTRY CRANE

CROSS-REFERENCE TO RELATED APPLICATIONS

Pursuant to 35 U.S.C. §119 and the Paris Convention Treaty, this application claims the benefit of Chinese Patent Application No. 200910061008.8 filed on Mar. 6, 2009, the contents of which are incorporated herein by reference.

BACKGROUND OF THE INVENTION

1. Field of the Invention

The invention relates to power acquisition equipment, and more particularly to power acquisition equipment for a rubber-tired gantry crane.

2. Description of the Related Art

Rubber-tired gantry cranes are widely used in ports all over the world, and power acquisition equipment operate to supply power thereto. However, there are several problems with the current power acquisition equipment: firstly, operation of the power acquisition equipment is complex and inefficient since operators are needed; secondly, they are unstable, unsafe and expensive; thirdly, they generate large noises and pollute the air during operation; finally, they take up a large space and cannot be retracted.

SUMMARY OF THE INVENTION

In view of the above-described problem, it is one objective of the invention to provide a power acquisition equipment that features simple operation and high efficiency, and is retractable, stable, safe, cost-effective, and environmental friendly.

To achieve the above objectives, in accordance with one embodiment of the invention, provided is power acquisition equipment, comprising: a power supplying portion, comprising: a pair of first posts, multiple second posts, multiple upper brackets, multiple lower brackets, multiple tightening devices, a cathode slide line, and an anode slide line, a power acquisition portion, comprising: a slide plate, a driving device, an adjusting device, a first base, and a linkage mechanism, and a control portion, comprising: a pair of front laser range sensors, a pair of back laser range sensors, multiple photoelectric detecting plates, a PLC controller, and an inverter driving system, wherein the second posts are disposed between the first posts with equal space and operate to support the cathode slide line and the anode slide line, the upper bracket, the lower bracket and the photoelectric detecting plate are disposed between the second posts, the cathode slide line and the anode slide line are disposed on the upper brackets and the lower bracket, the tightening devices are disposed on both ends of the slide line and connected to the first posts, the linkage mechanism is disposed on the first base, the photoelectric detecting plate is parallel to the slide line, the PLC controller and the inverter driving system are connected to the front laser range sensors and the back laser range sensors, to the power acquisition portion, and to travel motors of rubber-tired gantry cranes, one of the front laser range sensors and one of the back laser range sensors are connected to the photoelectric detecting plate, and the power acquisition portion is connected to one of the cathode slide line and the anode slide line.

In an embodiment of the invention, the power acquisition portion further comprises an insulator, a first spring, a bending board, a vertical hinge, and multiple insulated porcelain bottles.

In an embodiment of the invention, the linkage mechanism comprises a first fly jib, a second fly jib, a first pull rod, a second pull rod, a main boom, and a connecting rod.

In an embodiment of the invention, the first pull rod is connected to the head of the first fly jib, the second fly jib is connected to the head of the second pull rod, and the first fly jib is connected to the second pull rod via the connecting rod.

In an embodiment of the invention, one end of the main boom is hinge connected to the first base, and the other end thereof is hinge connected to the second fly jib.

In an embodiment of the invention, the first pull rod is connected to the second fly jib via the vertical hinge.

In an embodiment of the invention, the insulator is disposed on the vertical hinge, and the insulated porcelain bottles are disposed on the insulator.

In an embodiment of the invention, the number of the insulated porcelain bottles is 4.

In an embodiment of the invention, the driving device comprises a brake, a drum, a speed reducer, a motor, a steel cable, a second base, and a limiting cam.

In an embodiment of the invention, the brake and the drum are axially connected, the speed reducer and the motor are axially connected, the limiting cam is disposed on the brake, the steel cable is wrapped on the drum, and the speed reducer is disposed on the second base.

In an embodiment of the invention, the adjusting device comprises an ear plate, a second spring, a screw, and a nut.

In an embodiment of the invention, the ear plate is disposed on the first base, the nut is disposed on the screw, and the second spring is disposed between the ear plate and the screw.

In an embodiment of the invention, the electrode slide line and the anode slide line are double-slot copper lines, and are vertically and bilaterally installed.

In an embodiment of the invention, the first base is disposed on an upper beam of a rubber-tired gantry crane.

Advantages of the invention comprise:

The bending board is well contacted with the slide line.

The adjusting device automatically adjusts contact pressure, which ensures normal power acquisition even if the rubber-tired gantry crane is slightly deviates.

The first spring is capable of ensuring good adaptability of the rubber-tired gantry crane in operation.

The insulator and the insulated porcelain bottles ensure good insulation performance between the bending board and the linkage mechanism and improves safety.

Both sides of the slide wine are powered up simultaneously, whereby supplying power to two groups of rubber-tired gantry cranes on both sides thereof or to multiple rubber-tired gantry cranes on one side, which reduces container area and saves cost.

The laser range sensor controls a speed of the rubber-tired gantry crane, and keeps a distance between the power acquisition portion and the slide line within $L+\Delta L$ (L is a constant, and $\Delta L \leqq 200$ mm), whereby correcting deviation of the rubber-tired gantry crane.

Retraction of the power acquisition portion is controlled by the limiting cam, and no operator is needed, which makes the invention high efficient and safe.

The first posts and the second posts feature low cost and requirements for foundation properties, light weight, simple production and installation, convenient transportation, small influence on occupied space, and good time effectiveness of improvement.

One rubber-tired gantry crane uses four power acquisition equipment on both sides thereof, and the power acquisition equipment comply with the same standard.

BRIEF DESCRIPTION OF THE DRAWINGS

The invention is described hereinafter with reference to accompanying drawings, in which.

DETAILED DESCRIPTION OF THE EMBODIMENTS

Figure 1A:
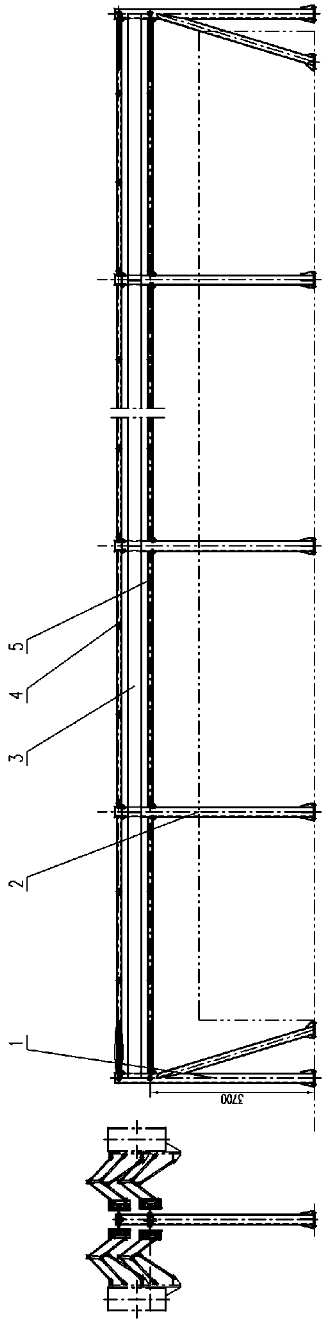
FIG. 1A is a front view of a power acquisition equipment of an exemplary embodiment of the invention.
Figure 1B:
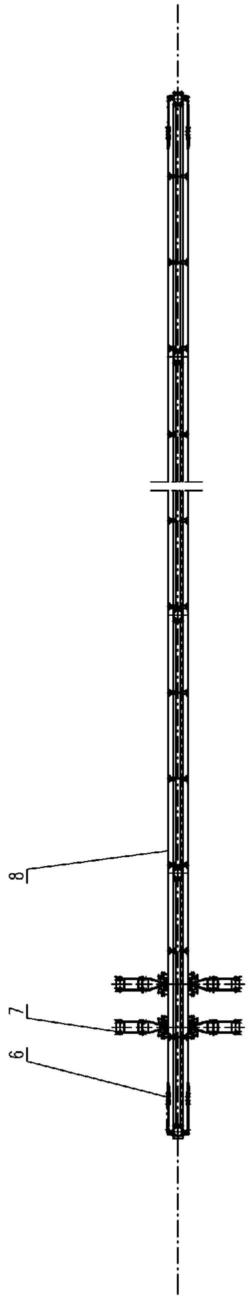
FIG. 1B is a top view of a power acquisition equipment of an exemplary embodiment of the invention.

As shown in FIG. 1, power acquisition equipment of the invention comprises a power supplying portion, a power acquisition portion, and a control portion.

The power supplying portion comprises a slide plate, a pair of first posts 1, multiple second posts 2, multiple upper brackets 4, multiple lower brackets 5, multiple tightening devices 6, a cathode slide line 8, and an anode slide line 8.

The second posts 2 are disposed between the first posts 1 with equal space and operate to support the cathode slide line and the anode slide line 8.

The upper bracket 4 and the lower bracket 5 are disposed between the second posts 2.

The cathode slide line and the anode slide line 8 are disposed on the upper brackets 4 and the lower bracket 5.

The tightening devices 6 are disposed on both ends of the slide line 8 and connected to the first posts 1.

The cathode slide line and the anode slide line 8 are double-slot copper lines, and are vertically and bilaterally installed, whereby enabling multiple rubber-tired gantry cranes on both sides thereof to acquire power therefrom.

Figure 2:
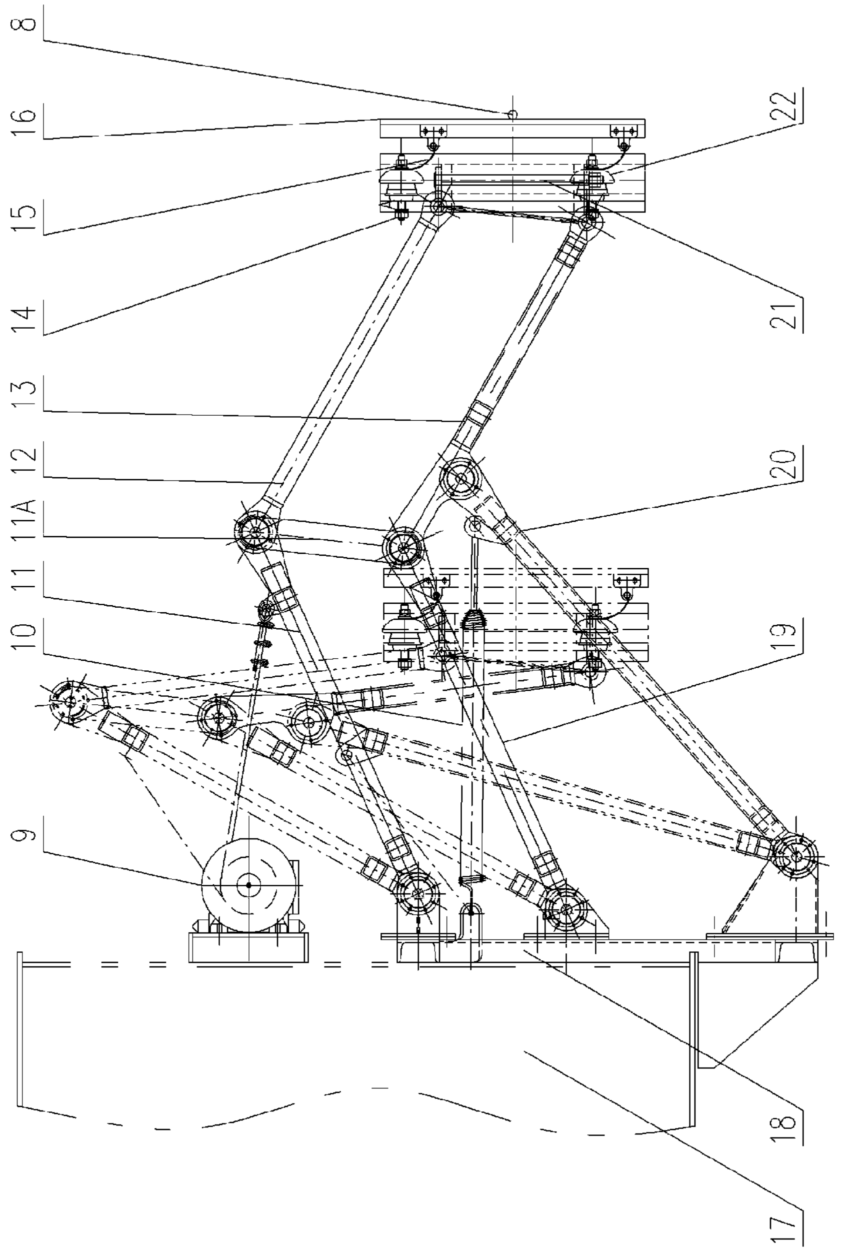
FIG. 2 is a schematic view of a power acquisition portion of the invention.

As shown in FIG. 2, the power acquisition portion 7 comprises a driving device 9, an adjusting device 10, a first base 18, a linkage mechanism, an insulator 14, a first spring 15, a bending board 16, a vertical hinge 21, and multiple insulated porcelain bottles 22.

The insulator 14 is disposed on the vertical hinge 21.

The insulated porcelain bottles 22 are disposed on the insulator 14. In this embodiment, the number of the insulated porcelain bottles 22 is 4.

The vertical hinge 21 is always vertical to the bending board 16.

The insulator 14 and the insulated porcelain bottles 22 ensure good isolation performance between the bending board 16 and the linkage mechanism.

As the power acquisition portion 7 is laid down, the bending board 16 is contacted with the slide line 8 whereby acquiring power therefrom.

The first spring 15 is disposed between the bending board 16 and the insulator 14, and capable of compensating seismic displacement. In this embodiment, the first spring 15 is a leaf first spring.

The first base 18 is disposed on an upper beam 17 of a rubber-tired gantry crane.

The linkage mechanism is disposed on the first base 18, and comprises a first fly jib 11, a second fly jib 13, a first pull rod 12, a second pull rod 19, a main boom 20, and a connecting rod 11A.

The first pull rod 12 is hinge connected to the head of the first fly jib 11, the second fly jib 13 is hinge connected to the head of the second pull rod 19, and the first fly jib 11 is hinge connected to the second pull rod 19 via the connecting rod 11A.

One end of the main boom 20 is hinge connected to the first base 18, and the other end thereof is hinge connected to the second fly jib 13, whereby supporting retraction of the linkage mechanism.

The first pull rod 12 is hinge connected to the second fly jib 13 via the vertical hinge 21.

Figure 3A:
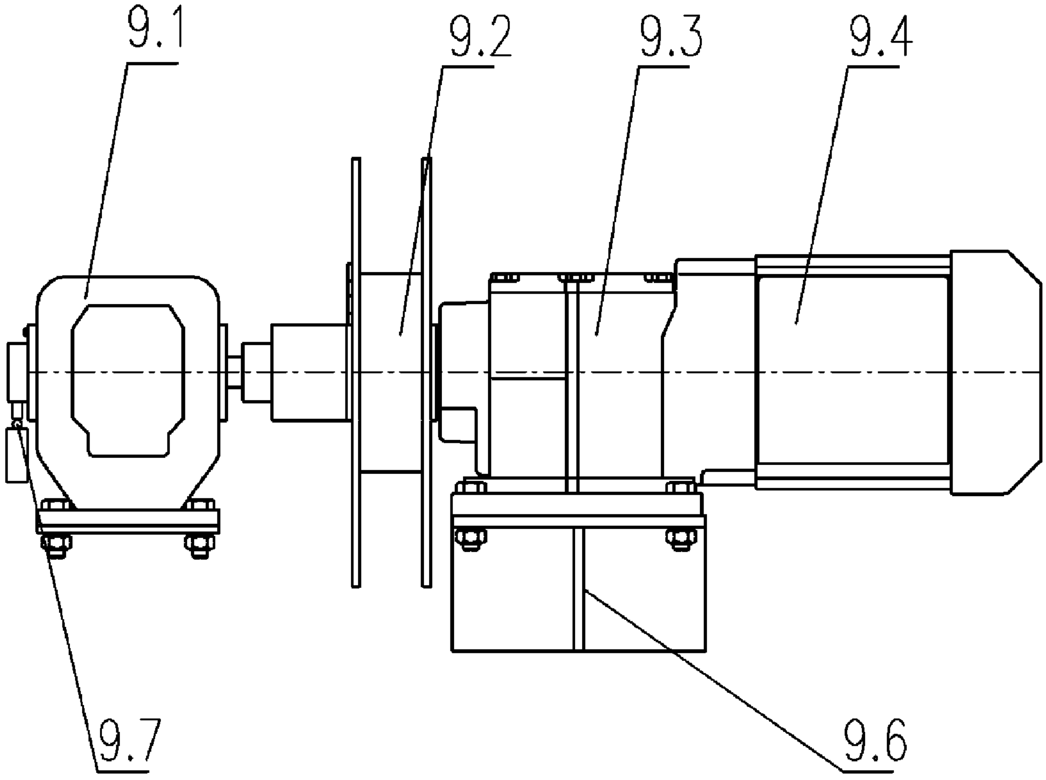
FIGS. 3A and 3B are schematic view of a driving device of the invention.
Figure 3B:
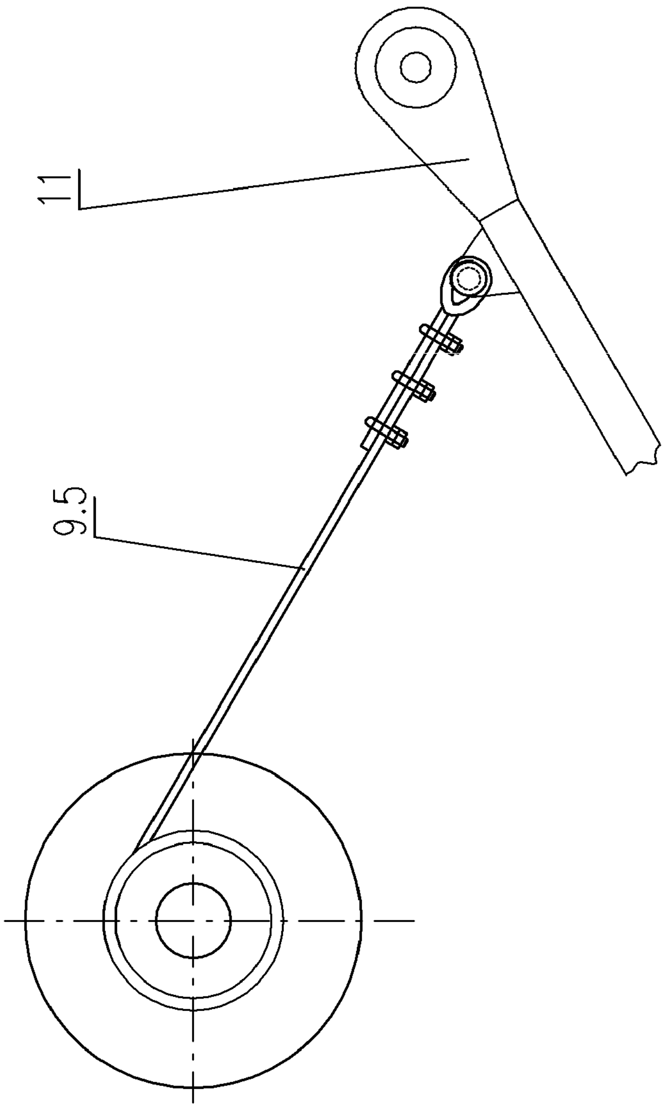

As shown in FIGS. 3A and 3B, the driving device 9 comprises a brake 9.1, a drum 9.2, a speed reducer 9.3, a motor 9.4, a steel cable 9.5, a second base 9.6, and a limiting cam 9.7.

The brake 9.1 and the drum 9.2 are axially connected, the speed reducer 9.3 and the motor 9.4 are axially connected, the limiting cam 9.7 is disposed on the brake 9.1, the steel cable 9.5 is wrapped on the drum 9.2, and the speed reducer 9.3 is disposed on the second base 9.6. As the motor 9.4 is started, the steel cable 9.5 controls retraction of the limiting cam 9.7. Once reaching a limit position, the limiting cam 9.7 sends a signal to control the motor 9.4 to stop, and gives acoustic-optic alarm indication.

Figure 4A:
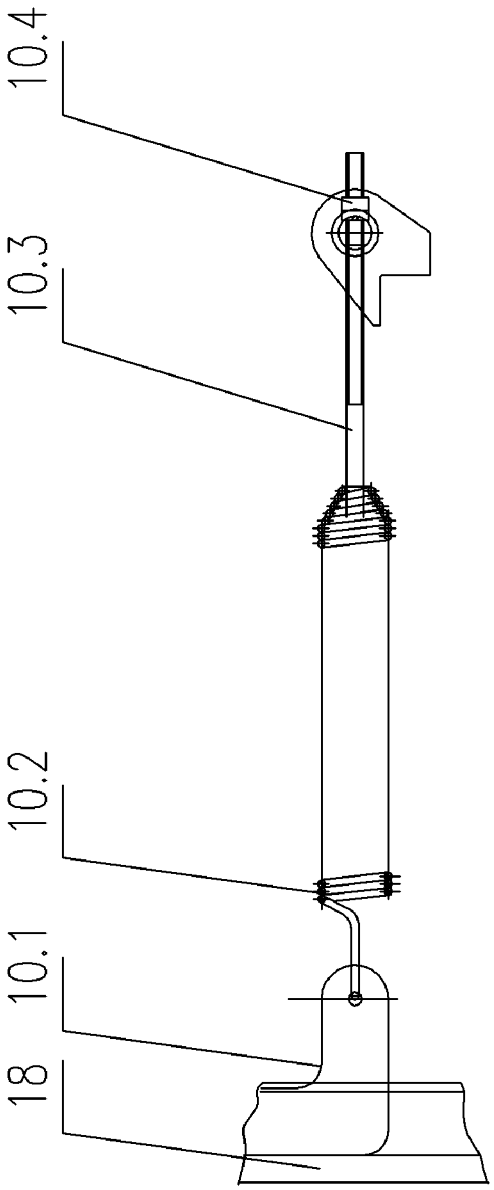
FIGS. 4A and 4B are schematic view of an adjusting device of the invention.
Figure 4B:
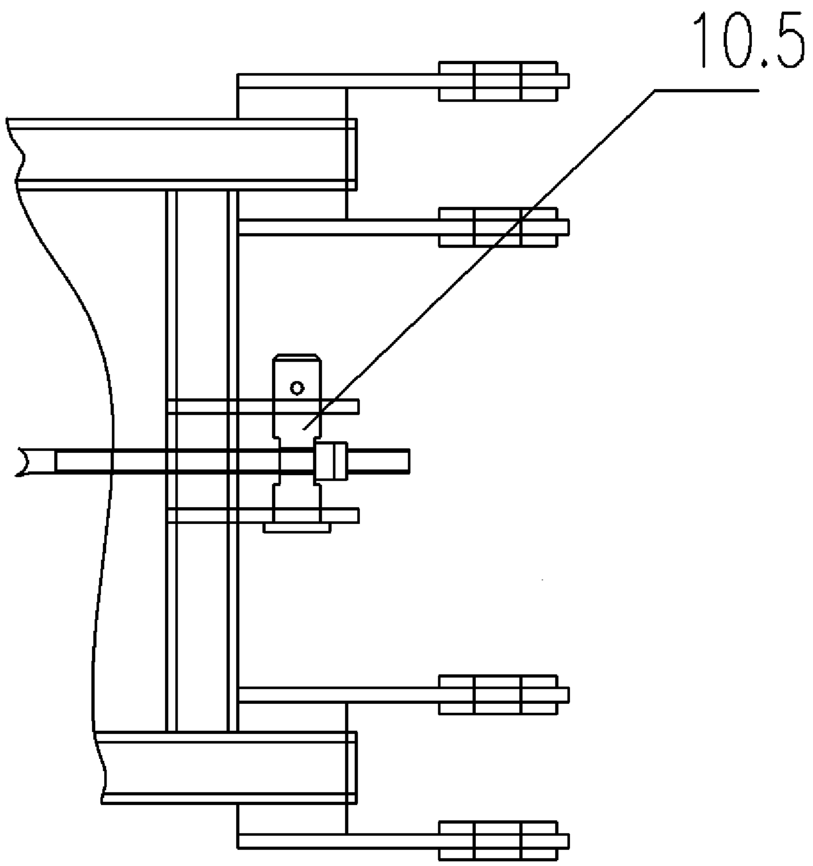

As shown in FIGS. 4A and 4B, the adjusting device 10 comprises an ear plate 10.1, a second spring 10.2, a screw 10.3, a nut 10.4, and a hinge shaft 10.5.

The ear plate 10.1 is disposed on the first base 18, the nut 10.4 is disposed on the screw 10.3, and the second spring 10.2 is disposed between the ear plate 10.1 and the screw 10.3.

The second spring 10.2 keeps moment balance between the adjusting device 10 and the power acquisition portion 7. A retraction force is laterally adjusted in a range of ±300 mm, so that a contact force between the slide plate and the slide line 8 is between 90 and 120 N.

The adjusting device 10 is connected to the main boom 20 via the hinge shaft 10.5. A position of the screw 10.3 is varied, and then fixed via the nut 10.4, so that a contact force between the bending board 16 and the slide line 8 is between 90 and 120 N.

Figure 5:
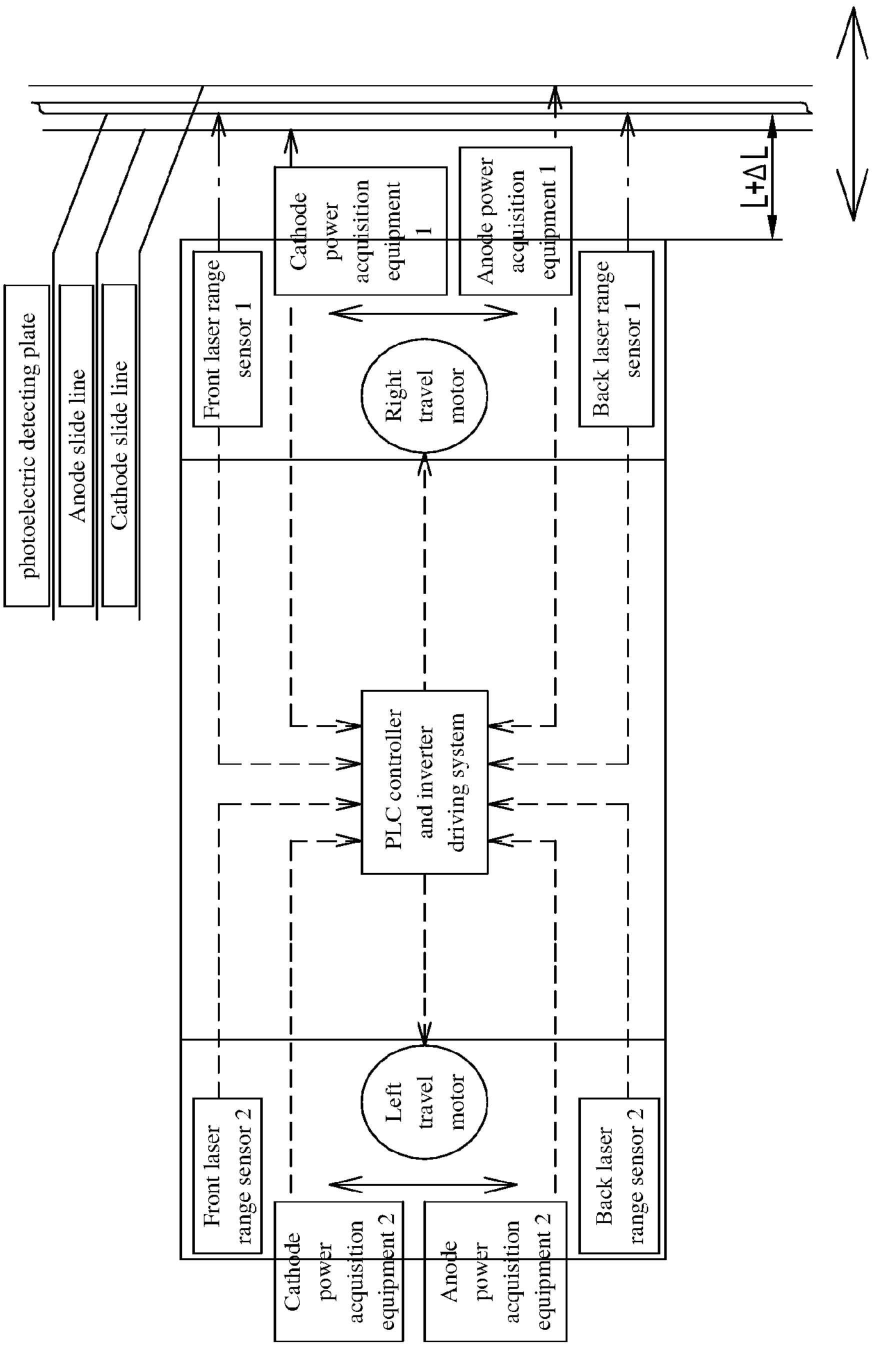
FIG. 5 is a schematic view of a control portion of the invention.

As shown in FIG. 5, the control portion comprises a pair of front laser range sensors, a pair of back laser range sensors, multiple photoelectric detecting plates 3, a PLC controller, and an inverter driving system.

The photoelectric detecting plate 3 is parallel to the slide line 8 and disposed between the second posts 2.

The PLC controller and the inverter driving system are connected to the front laser range sensors and the back laser range sensors, to the power acquisition portion, and to travel motors of rubber-tired gantry cranes. One of the front laser range sensors and one of the back laser range sensors are connected to the photoelectric detecting plate 3, and the power acquisition portion 7 is connected to one of the cathode slide line and the anode slide line 8.

The front laser range sensors and the back laser range sensors control a velocity of the rubber-tired gantry crane, correct deviation thereof, and keeps a distance between the power acquisition portion 7 and the slide line 8 within L+□L (L is a constant, and □L≦200 mm). For example, as the rubber-tired gantry crane travels forwards, if the front laser range sensor detects □L≧200 mm and the back laser range sensor detects □L≦200 mm, the laser range sensor transmits a signal to the PLC controller and the inverter driving system, and the PLC controller and the inverter driving system control a velocity of a left travel motor of the rubber-tired gantry crane to be 1-5% greater than that of a right travel motor thereof. After the distance is within L+□L, a velocity of the left travel motor is the same as that of the right travel motor. The same principle applies if the rubber-tired gantry crane travels backwards.

Figure 6:
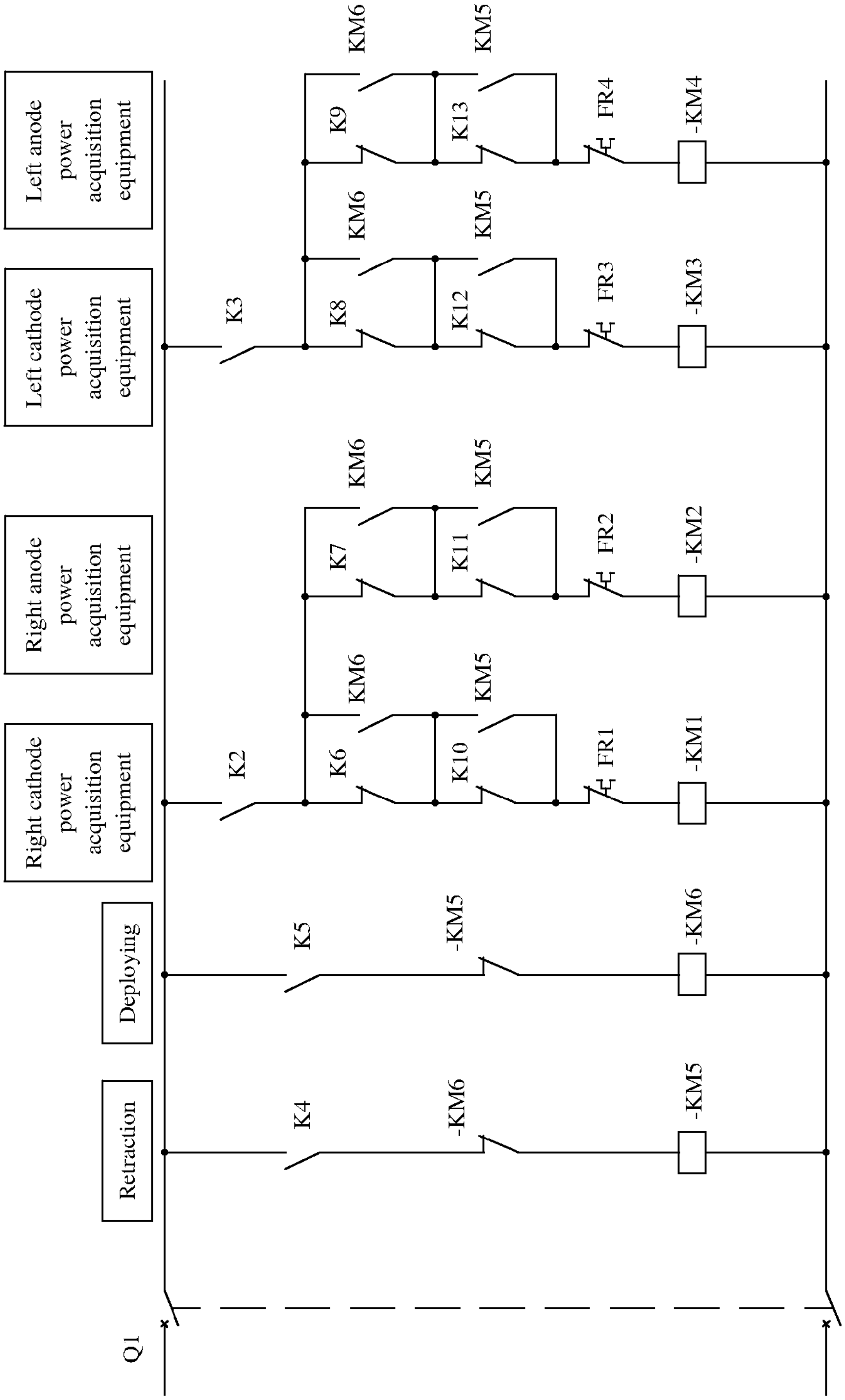
FIGS. 6 and 7 illustrate control and position limitation protection of the invention.
Figure 7:
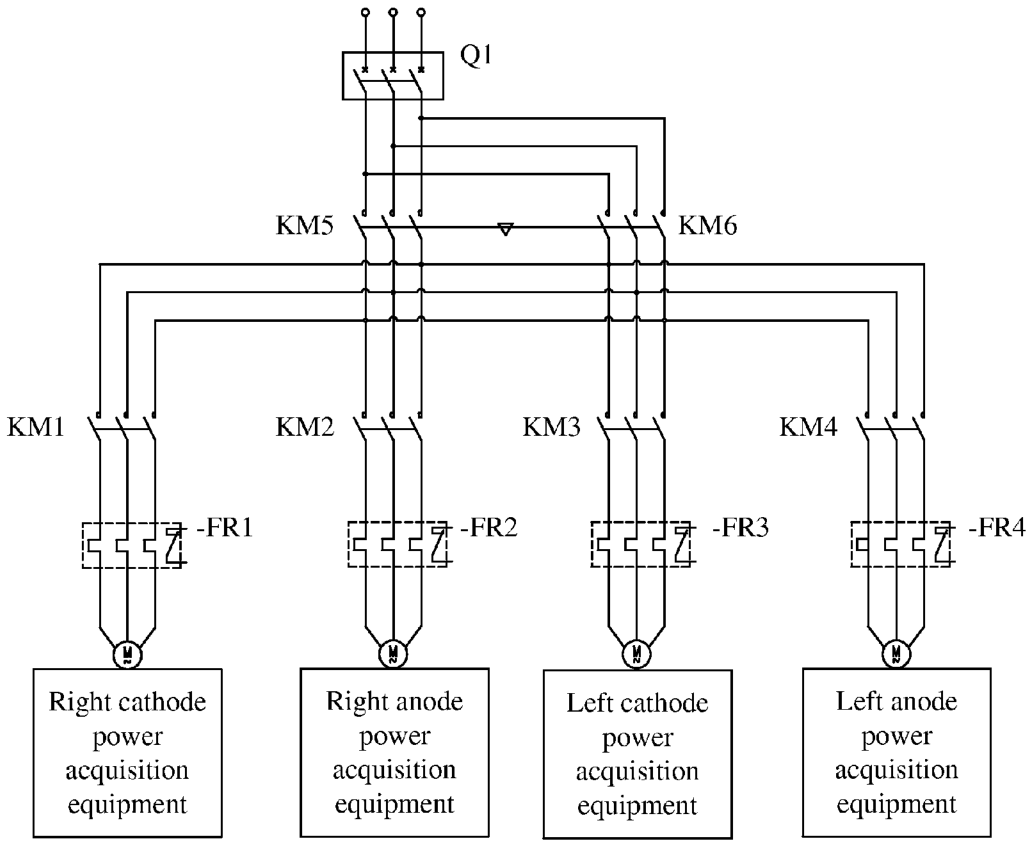

As shown in FIGS. 6 and 7, a first switch K2 and a second switch K3 disposed on the right of a cab respectively controls retraction of the power acquisition portion on the right and left of the rubber-tired gantry crane. For example, retraction of the power acquisition portion on the right of the rubber-tired gantry crane is controlled by the switch K2 or a PLC instruction from the cab, deploying and retraction are controlled by relays K4 and K5, and interlocking is controlled by KM5 and KM6. The deploying process and the reaction process are reciprocal. As the switch K5 is deployed, KM6 is closed, the motor enters an inversion driving state, the first switch K2, an inverter KM6, a limiting switch K10 controls KM1 to close, and the right cathode power acquisition equipment is laid down, as the right cathode power acquisition equipment reaches a limit position, the limiting switch K10 is opened, and the right cathode power acquisition equipment stops retracting and the power acquisition equipment acquires power therefrom. As K4 is retracted, KM5 is closed, the motor enters a normal state, the first switch K2, the limiting switch K6 and the inverter KM5 control KM1 to close, the right cathode power acquisition equipment is retracted, as the right cathode power acquisition equipment reaches a limit position, the limiting switch K6 is opened, the right cathode power acquisition equipment reaches stops retracting. The same principle applies for the right anode power acquisition equipment, and the right anode power acquisition equipment and the right cathode power acquisition equipment are simultaneously laid down.

As the rubber-tired gantry crane is turned over, the right power acquisition equipment is retracted, and then the rubber-tired gantry crane acquires power from the left power acquisition equipment. At this time the second switch K3 is closed to retract and deploy the left power acquisition equipment. The principle is the same as above.

While particular embodiments of the invention have been shown and described, it will be obvious to those skilled in the art that changes and modifications may be made without departing from the invention in its broader aspects, and therefore, the aim in the appended claims is to cover all such changes and modifications as fall within the true spirit and scope of the invention.

The invention claimed is:

1. Power acquisition equipment, comprising a power supplying portion, comprising
- a pair of first posts;
- multiple second posts;
- multiple upper brackets;
- multiple lower brackets;
- multiple tightening devices;
- a cathode slide line; and
- an anode slide line;

a power acquisition portion, comprising:
- a slide plate;
- a driving device;
- an adjusting device;
- a first base; and
- a linkage mechanism; and a control portion, comprising:
- a pair of front laser range sensors;
- a pair of back laser range sensors;
- multiple photoelectric detecting plates;
- a PLC controller; and
- an inverter driving system;

wherein said second posts are disposed between said first posts with equal space and operate to support said cathode slide line and said anode slide line;

said upper bracket, said lower bracket and said photoelectric detecting plate are disposed between said second posts;

said cathode slide line and said anode slide line are disposed on said upper brackets and said lower bracket;

said tightening devices are disposed on both ends of said slide line and connected to said first posts;

said linkage mechanism is disposed on said first base;

said photoelectric detecting plate is parallel to said slide lines;

said PLC controller and said inverter driving system are connected to said front laser range sensors and said back laser range sensors, to said power acquisition portion, and to travel motors of a rubber-tired gantry crane;

one of said front laser range sensors and one of said back laser range sensors are connected to said photoelectric detecting plate; and said power acquisition portion is connected to one of said cathode slide line and said anode slide line.

2. The power acquisition equipment of claim 1, wherein said power acquisition portion further comprises an insulator, a first spring, a bending board, a vertical hinge, and multiple insulated porcelain bottles.

3. The power acquisition equipment of claim 2, wherein said linkage mechanism comprises a first fly jib, a second fly jib, a first pull rod, a second pull rod, a main boom, and a connecting rod.

4. The power acquisition equipment of claim 3, wherein said first pull rod is connected to the head of said first fly jib;

said second fly jib is connected to the head of said second pull rod; and said first fly jib is connected to said second pull rod via said connecting rod.

5. The power acquisition equipment of claim 3, wherein one end of said main boom is hinge connected to said first base, and the other end thereof is hinge connected to said second fly jib.

6. The power acquisition equipment of claim 3, wherein said first pull rod is connected to said second fly jib via said vertical hinge.

7. The power acquisition equipment of claim 3, wherein said insulator is disposed on said vertical hinge, and said insulated porcelain bottles are disposed on said insulator.

8. The power acquisition equipment of claim 7, wherein the number of said insulated porcelain bottles is 4.

9. The power acquisition equipment of claim 1, wherein said driving device comprises a brake, a drum, a speed reducer, a motor, a steel cable, a second base, and a limiting cam.

10. The power acquisition equipment of claim 9, wherein said brake and said drum are axially connected;

said speed reducer and said motor are axially connected;

said limiting cam is disposed on said brake;

said steel cable is wrapped on said drum; and said speed reducer is disposed on said second base.

11. The power acquisition equipment of claim 1, wherein said adjusting device comprises an ear plate, a second spring, a screw, and a nut.

12. The power acquisition equipment of claim 11, wherein said ear plate is disposed on said first base;

said nut is disposed on said screw; and said second spring is disposed between said ear plate and said screw.

13. The power acquisition equipment of claim 1, wherein said cathode slide line and said anode slide line are double-slot copper lines, and are vertically and bilaterally installed.

14. The power acquisition equipment of claim 1, wherein said first base is disposed on an upper beam of a rubber-tired gantry crane.

* * * * *